Feb. 21, 1967   J. CADIOU   3,305,040
AUTOMOBILE VEHICLES FITTED WITH DISC BRAKES
Filed Dec. 21, 1964   2 Sheets-Sheet 1

INVENTOR
Jean Cadiou
By Stevens, Davis, Miller + Mosher
ATTORNEY

United States Patent Office 3,305,040
Patented Feb. 21, 1967

3,305,040
AUTOMOBILE VEHICLES FITTED WITH DISC BRAKES
Jean Cadiou, Paris, France, assignor to Société Anonyme, André Citroën, Paris, France
Filed Dec. 21, 1964, Ser. No. 419,893
Claims priority, application France, Dec. 31, 1963, 959,123
5 Claims. (Cl. 180—64)

The present invention relates to automobile vehicles which comprise disc brakes on two horizontal output shafts from a gear box assembled with the vehicle engine, which brakes each include a brake frame fixed to the casing of said gear box and disposed astride a portion of the periphery of a disc driven by one of said output shafts, two friction members mounted on said frame on either side of the disc so that at least one of them can slide with respect to this frame parallelly to the corresponding output shaft, and means for displacing said movable friction member or members, with respect to the frame in the direction which tends to tightly catch the disc between the two friction members.

The object of the present invention is to provide a vehicle of this type such that the casing of the propelling unit thereof (that is to say of the unit comprising the internal combustion engine, the clutch and the gear box) comprises a minimum number of mounting bosses and is therefore easier to manufacture.

The vehicle according to the present invention, the propelling unit of which is disposed between two longitudinal side members of the vehicle frame, is characterized in that said propelling unit is fixed, on the one hand, directly to each of the side members through the end of the propelling unit casing remote from the gear box, and, on the other hand, to a transverse structure connecting the whole of the two brake frames to both of the longitudinal frame side members, resilient elements being advantageously interposed in the means for directly securing the propelling unit to each of the longitudinal side members and in said transverse structure.

A preferred embodiment of the present invention will be hereinafter described with reference to the appended drawings, given merely by way of example, and in which.

Figure 1:
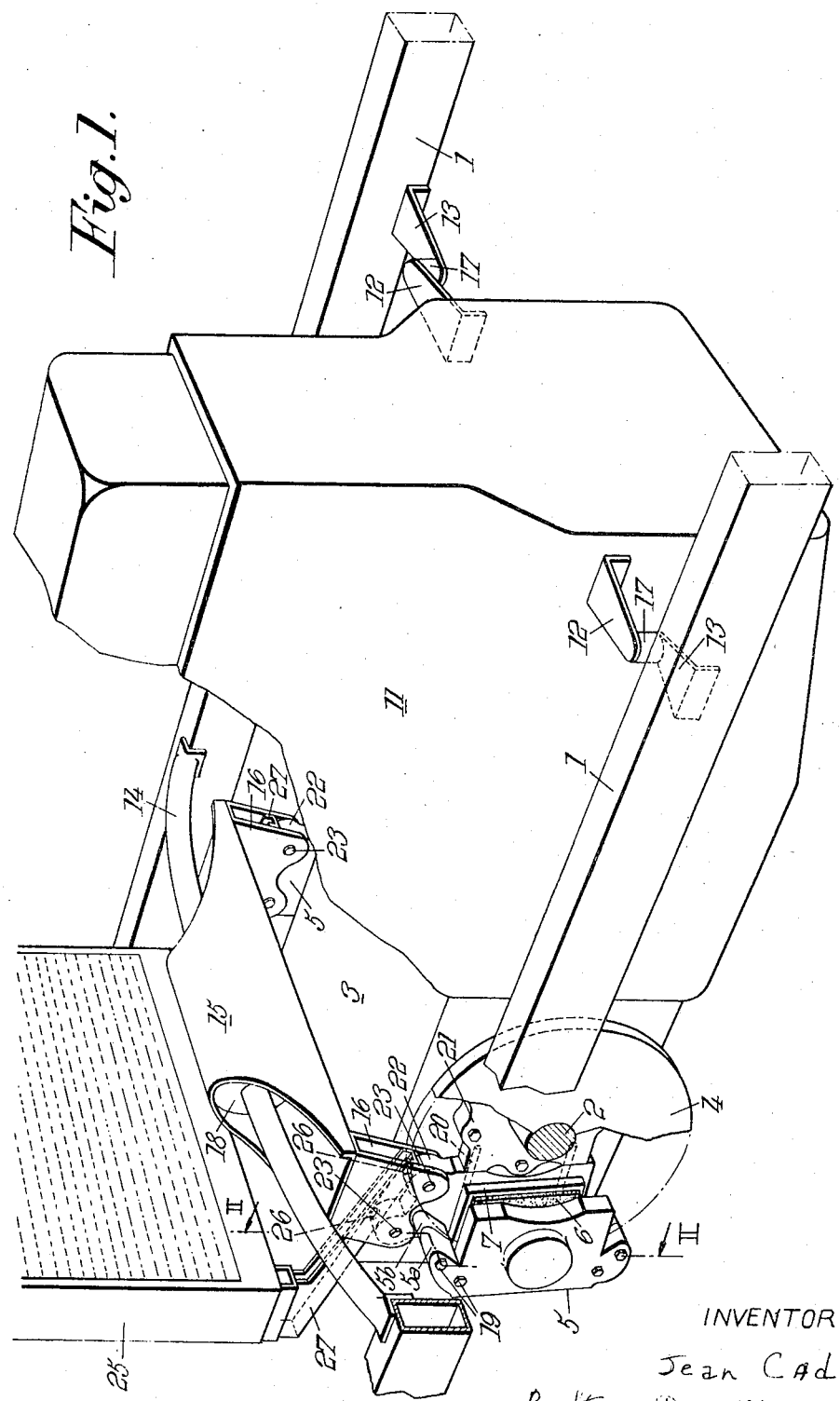
FIG. 1 is a perspective view of the main elements of an automobile vehicle made according to the invention.
Figure 2:
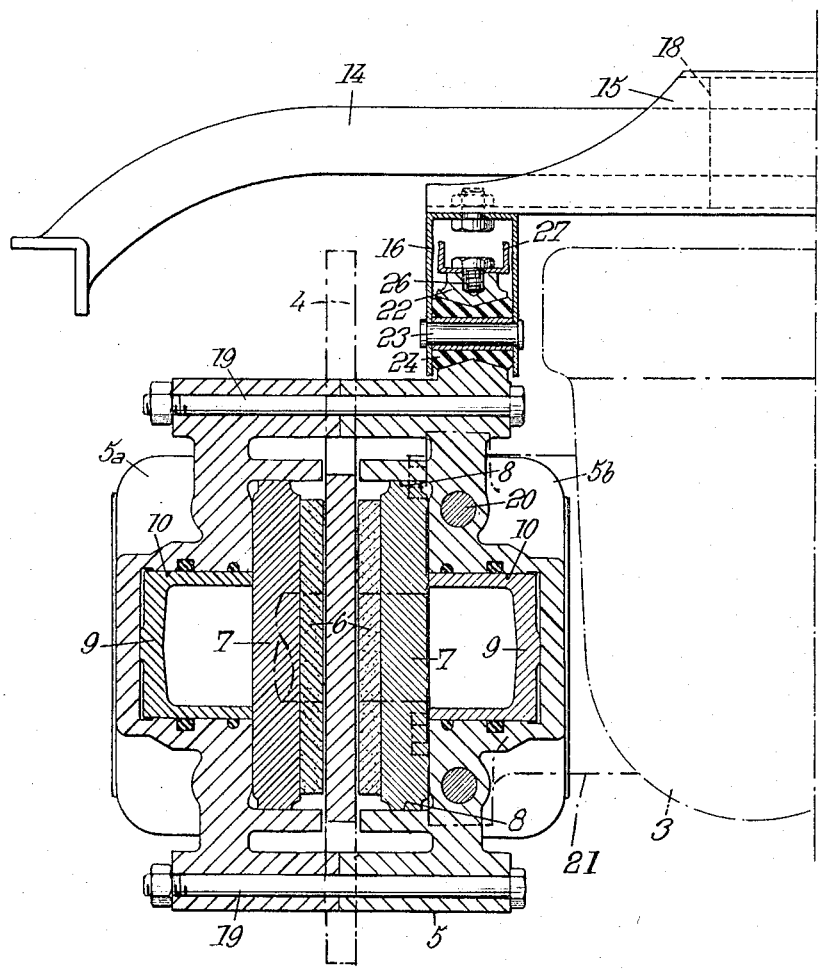
FIG. 2 is a vertical transverse sectional view on the line II—II of FIG. 1.

The vehicle is such that each output shaft 2 issuing from the casing 3 of the gear box drives, in addition to the corresponding vehicle wheel (not shown), a brake disc 4. Each brake comprises a frame 5 fixed to casing 3 and disposed astride a portion of the periphery of disc 4, two friction members 6 mounted on frame 5 on either side of disc 4, respectively, in such manner that at least one of them can slide with respect to said frame parallelly to the corresponding shaft 2, and means for moving said movable friction member or members with respect to frame 5 in the direction for which disc 4 is tightly held between the two friction members 6.

Preferably, as shown, disc 4 is rigid with shaft 2 and friction members 6 are both movable and actuated separately by said means.

In order to guide friction members 6 with respect to frame 5, said friction members 6 are carried by rigid plate 7 the edges of which are slidable along surfaces 8 of frame 5. In order to actuate these friction members, use is made of hydraulic (or pneumatic) means consisting of pistons 9 slidable in cylinders 10. These cylinders 10 are rigid with the corresponding frames 5 and are adapted to be simultaneously fed with fluid under pressure. Said hydraulic or pneumatic means may be completed or replaced by mechanical means (not shown).

The gear box casing 3 (which may also be the casing of a differential gear) being rigidly assembled with the crank case 11 of the internal combustion engine so as to form a block located between side members 1, this block is secured on the one hand directly to each of the side members through the end of the block opposed to the gear box (which end is on the right hand side of FIG. 1) and, on the other hand to a transverse structure connecting both of the brake frames 5 to the whole of the side members 1.

In order to secure the block directly to the side members, there is provided, on either side of case 11, lugs 12 bearing upon side members 1, for instance through brackets 13 rigid with said side members.

As for the above mentioned structure, it comprises a cross member 14 having its two ends connected to said members 1, respectively, and a sleeve 15, inside which cross member 14 extends and provided, at both of its ends, with straps 16 to which brake frames 5 are secured.

Advantageously, resilient elements are interposed on the one hand between lugs 12 and brackets 13 and on the other hand in the transverse structure just above described. For this purpose lugs 12 bear upon rubber blocks 17 supported by brackets 13 and a tubular rubber block 18 is fitted in sleeve 15 for passage of cross member 14 therethrough.

As shown by the drawings, each brake frame 5 may consist of two elements 5a and 5b approximately symmetrical with respect to disc 4 and assembled together by bolts 19 parallel to the axis of the disc. The inner element 5b is itself rigidly secured, through bolts 20 substantially parallel to side members 1, to a side plate 21 rigid with the gear box casing 3, shaft 2 extending through said side plate 21. The upper portion 22 of element 5b is engaged in strap 16 and it is secured to said strap through bolts 23, rubber blocks 24 being advantageously interposed between strap 16 and element 5b.

Advantageously, as shown, when the internal combustion engine is water cooled, the radiator 25 of said engine is secured to frames 5. For this purpose, as shown, the upper portion 22 of the inner elements 5b carries, secured thereto by means of screws 26, arms 27 which project to the outside of strap 16 so as to act as supports for the lower portion of radiator 25.

In a vehicle as above described, the propelling unit is carried, on the one hand, by brackets 13, with the interposition of resilient blocks 17, and, on the other hand, by cross member 14, through rubber block 18, sleeve 15, straps 16, frame elements 5b and side plates 21 which are rigid with the gear box casing 3. This construction permits of dispensing with the bosses or other mounting means which are generally provided, in addition to lugs or bosses 12 and on the other side therefrom, for the direct fixation of the propelling unit to side members 1, which facilitates the machining of the propelling unit and consequently reduces the cost thereof.

Furthermore, in view of the fact that radiator 25 is secured to brake frames 5 which are themselves rigid with the propelling unit, the water pipes to be provided between the radiator and the engine are free from the stresses and strains which would be unavoidable if the radiator were fixed directly to said members 1, as it is generally the case.

In a general manner, while the above description discloses what is deemed to be a practical and efficient embodiment of the present invention, said invention is not limited thereto as there might be changes made in the arrangement disposition and form of the parts without departing from the principle of the invention as comprehended within the scope of the appended claims.

What I claim is:

1. An automobile vehicle which comprises, in combination,
   two longitudinal frame side members,
   a propelling unit including an internal combustion engine block, a gear box, and a casing for said engine block and said gear box, said propelling unit being located between said frame side members,
   two gear box output shafts extending transversely from said casing,
   at least two brake devices, each including:
   a brake disc operatively connected with one of said gear box output shafts, respectively, to be driven by it,
   a brake frame rigidly secured to said casing and located astride a portion of the periphery of said brake disc,
   two friction members carried by said brake frame on either side of said brake disc, at least one of said friction members being slidable with respect to said brake frame parallelly to the corresponding gear box output shaft, and
   means for moving said slidable friction member in the direction for which said disc is tightly held between said friction members, and
   a transverse structure rigidly interconnecting the side members,
   means for securing the end of said propelling unit casing remote from said gear box directly to said frame longitudinal side members, and
   means securing said transverse structure to said propelling unit.

2. An automobile vehicle according to claim 1 wherein said means for securing said propelling unit casing directly to said frame longitudinal side members include resilient means and said transverse structure includes resilient means.

3. An automobile vehicle according to claim 1 wherein each brake frame comprises:
   an inner element and an outer element substantially symmetrical with respect to said brake disc,
   rigid means for assembling said elements together,
   a side plate rigid with said propelling unit casing and through which a corresponding one of said two gear box output shafts extends,
   the inner element of said brake frame being rigidly fixed to said side plate.

4. An automobile vehicle according to claim 1 wherein said transverse structure comprises:
   a cross member having its ends secured to said longitudinal frame side members,
   said last named means including a transverse sleeve inside which said cross member extends, and
   two straps carried by the ends of said transverse sleeve and carrying said brake frames, respectively.

5. An automobile vehicle according to claim 1 further comprising a radiator for said internal combustion engine and means securing said radiator to said brake frames.

References Cited by the Examiner

UNITED STATES PATENTS

| 1,982,316 | 11/1934 | Mackenzie | 180—54 |
| 2,084,080 | 6/1937 | D'Aubarede | 180—64 |
| 2,099,703 | 11/1937 | Paton | 180—64 X |
| 2,714,936 | 8/1955 | Gregory | 180—54 X |

FOREIGN PATENTS

| 775,086 | 11/1957 | Great Britain. |

A. HARRY LEVY, *Primary Examiner.*